G. W. AMANN, Jr.
ELECTRIC MOTOR.
APPLICATION FILED DEC. 21, 1917.

1,374,171.

Patented Apr. 12, 1921.

WITNESSES
W. E. Fielding
H. G. Pierson

INVENTOR
George W. Amann Jr.

BY Richard Owen.

ATTORNEY

UNITED STATES PATENT OFFICE.

GEORGE W. AMANN, JR., OF LITTLE BLACK, WISCONSIN.

ELECTRIC MOTOR.

1,374,171.    Specification of Letters Patent.    Patented Apr. 12, 1921.

Application filed December 21, 1917. Serial No. 208,282.

*To all whom it may concern:*

Be it known that I, GEORGE W. AMANN, Jr., a citizen of the United States, residing at Little Black, in the county of Taylor and State of Wisconsin, have invented certain new and useful Improvements in Electric Motors, of which the following is a specification.

This invention is an electric motor more particularly adapted for the operation of toys or other devices requiring a small amount of power, wherein the motor is provided with suitable reversing means, and is also constructed to convert rectilinear motion into rotary motion.

One object of the invention is to provide an electric motor with oppositely positioned electro-magnets that are slightly offset from each other in a horizontal plane.

Another object of the invention is to provide the electro-magnets or field magnets with armatures that are adapted to be attracted by the polar extremities of the electro-magnets.

A further object of the invention is to provide an electric motor with field magnets having armatures adapted to be attracted thereby, and connecting each of the armatures with a rotatably mounted shaft so that the reciprocatory motion is converted into rotary motion.

A still further object of the invention is to provide means for automatically connecting the winding of one set of field magnets to attract its armature, then breaking the circuit and connecting the winding of the opposite set of field magnets.

One purpose of the invention is to provide an electric motor with a reversing means so that its application in the running of toys may be more extended and therefore provide for greater utility.

Broadly stated, the invention comprises a base having mounted at each end a plurality of electro-magnets, the cores of each of the electro-magnets being provided with a reduced projecting end that is adapted to serve as a guide for the armatures, said armatures being provided with suitable apertures for engaging with said reduced ends, a plurality of spaced pedestal bearings that are adapted to receive and retain a shaft that is rotatably mounted therein, said shaft being provided with suitable portions serving as crank pins that lie in the same plane, a plurality of spaced contact elements that also lie in one plane, which plane is different from that in which the crank pins lie, a pedestal intermediate of the bearings that is adapted to rotatably mount suitable curved members serving as contacts, said contacts being adapted to be alternately engaged by the contacts carried by the crank shaft, said contacts being further provided with insulation, and means to rotate said curved contacts so that the direction of rotation of the crank shaft may be changed, said crank shaft being provided with a fly wheel of sufficient weight, and a pulley for driving purposes, the circuiting arrangement for the electro-magnets being one that provides for alternately connecting the field magnets and if desired employing the base as one portion of the circuit.

One practical form of construction and assembly will be described and illustrated in the accompanying drawings, in which :—

Figure 1:
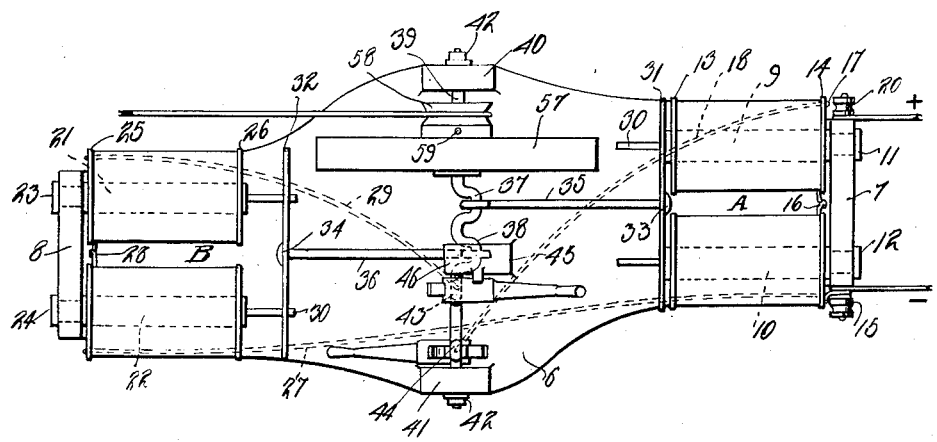
Figure 1 is a top plan view of the assembled motor.

In the preferred embodiment about to be described, a base 5 may be formed of any suitable material but for the present purposes it is desired to make it of iron. The base 5 as shown in Fig. 1 is of peculiar form being wider at the central portion as indicated at 6, so that its ends are offset from its longitudinal axis. At each end of the base it is provided with upstanding ends 7 and 8 that serve as supports for the electro-magnets generally indicated at A and B.

The electro-magnets A and B may be of the usual type of construction that includes two cores indicated at 9 and 10. These cores 9 and 10 are adapted to be held in position upon the end 7 in any usual or customary manner such as the bolts 11 and 12. The ends at this time serve as yokes. The electro-magnets A and B which constitute the field magnets are preferably positioned in the same horizontal plane.

The cores 9 and 10 may be provided with a suitable winding that is maintained in position between the heads 13 and 14. The winding upon each one of the cores 9 and 10 is provided with terminals, two of which are connected together in the usual manner, One terminal of the winding upon the core 10 is connected with an insulated binding post 15 that serves as a line terminal.

Figure 2:
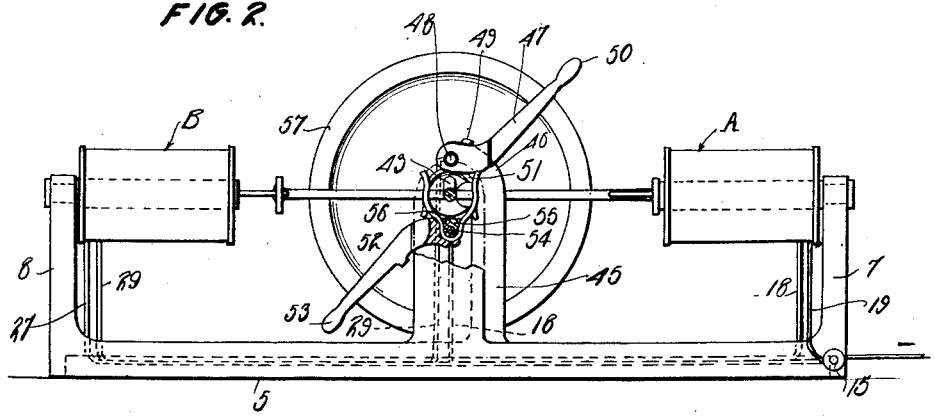
Fig. 2 is a side elevation of the assembled motor with parts broken away to show more clearly the contacts and the manner of reversing and completing the circuit.

The other terminal of the winding wound upon the core 10 is connected with a terminal of the winding wound upon the core 9 as indicated at 16. The other terminal of this winding indicated at 17 has connected to it a conductor 18 that passes to and is connected with a device that will be more fully described hereafter. As shown in Fig. 2 the binding post 15 connects with the winding upon the core 10 by means of the jumper 19. Upon the opposite side of the end 7 there is mounted another binding post 20 that serves as the other line terminal. As shown this terminal is mounted upon the end 7. The end 8 has also mounted upon it a pair of cores indicated at 21 and 22 that may be secured upon the end by any suitable means as indicated by the bolts 23 and 24.

These cores have mounted thereon the heads indicated at 25 and 26 and between these heads is a winding. The winding upon the core 22 has one terminal connected with a conductor indicated at 27 that is connected with the binding post 15. The other end of this winding connects with an end of the winding on the core 21 as indicated at 28. The other end of this winding upon the core 21 is connected to a device which will be more fully described hereafter, by means of the conductor 29.

Each of the cores 9, 10, 21, and 22 are provided with the pins or guides 30 as shown and with a copper shield or plate. These pins are preferably inserted with a driving fit into suitable holes formed in the ends of the cores. The pins should be of sufficient length to project outward beyond the limit of motion of the armature and are formed for the purpose of providing guides for the armatures 31 and 32. These armatures 31 and 32 are preferably formed of magnetic material such as soft iron and are adapted to coöperate with the cores of the electro-magnets A and B. For this purpose they are provided with suitable holes through which pass the guides or stems 30.

The plates 31 and 32 are provided with suitable holes to provide for riveting the ends of the connecting rods 35 and 36 thereto, the heads of the rivets being shown at 33 and 34.

Upon opposite sides of the enlarged portion 6 of the base 5 there are mounted the bearing pedestals 40 and 41. The shaft 39 is adapted to extend through suitable bearings formed in the upper ends of these pedestals. The shaft in projecting exteriorly of the pedestals may be provided with suitable means for preventing excessive axial movement such as the collars 42 which may be secured thereon in any suitable manner.

The crank shaft 39 is provided at suitable points with the cranked portions having the crank pins 37 and 38. These pins lie preferably in the same plane or in other words the two cranked portions lie in the same plane. As shown the crank pins 37 and 38 are spaced from each other.

At suitable spaced intervals the shaft 39 is provided with the projections indicated at 43 and 44, which are adapted to serve as contacts. At a suitable point on the base there arises another pedestal indicated at 45 which has its upper end curved as indicated at 46 so that the end lies over the crank shaft but is spaced therefrom.

The pedestal 45 has at its upper end a lever 47 which is eccentrically mounted, the point of pivoting being indicated at 48. The curved end 46 is provided with a stop 49 that limits the movement of this lever 47 in one direction. This lever 47 is also provided with a handle indicated at 50. This lever 47 has mounted thereon a yoke or U-shaped member the limbs of which are formed of resilient material. This yoke which may be indicated at 51 is preferably insulated from its point of securement on the lever 47.

The yoke member 51 serving as a contact is adapted to be intermittently engaged by the contact 43 mounted upon the crank shaft 39. The conductor 29 is suitably connected with the yoke member 51. The pedestal 41 may have mounted thereon the lever 52, which lever is provided with a handle 53. The lever 52 is preferably eccentrically mounted upon the pivotal point or pin 54. As shown in Fig. 2 this pin 54 is surrounded by an insulating block 55. Mounted upon this block 55 is a yoke member 56 that is similarly formed to that described for the yoke 51.

Figure 3:
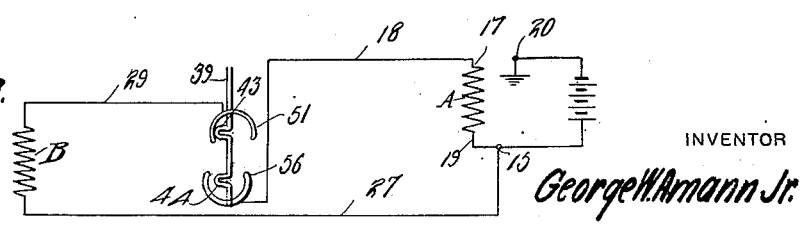
Fig. 3 is a diagrammatic view showing the circuiting arrangement.

The other end of the conductor 18 is connected to the yoke 56. The levers 47 and 52 are adapted to shift the yokes 51 and 56 so as to cause them to be alternately engaged by means of the contacts 43 and 44 of the crank shaft 39. As shown in the diagram the yoke 51 is so positioned that the contact 43 is engaging therewith, and the contact 44 is not engaging with the yoke 56. A continued movement of the crank shaft 39 will cause the contact 43 to disengage itself from the yoke 51 thus breaking the circuit to the conductor 29 and shortly thereafter the contact 43 engages with the yoke 56 completing the circuit to the conductor 18. The diagram Fig. 3 shows more clearly how these yokes are positioned and indicates that they are not in axial alinement but are slightly displaced.

The base 5 may be provided with suitable channels for receiving the several conductors as shown more particularly in Fig. 2. As one end of the line wire is connected with the insulated terminal 15 and the other wire is connected with the terminal 20 the base, bearing pedestals, and the crank shaft constitute the other side of the circuit.

In order to provide for a better turning movement and to continue the rotative effort a fly wheel 57 is employed. This fly wheel should have a rim of sufficient weight to continue movement through the energy stored in its rim. The fly wheel may also be provided with a driving pulley indicated at 58. The pulley 58 if desired may be separately secured upon the driving shaft 39 by means of suitable fastening means such as shown by the set screw 59.

What is claimed is:—

In an electric motor the combination of two pairs of electro-magnets being in the same plane and out of alinement with one another, movable armatures adapted to be acted on by said electro-magnets, a crank shaft rotatably mounted in the same plane with and between said pairs of electro-magnets and provided with spaced contacts lying in the same plane, a lever provided with a yoke adapted to overlie and to be intermittently engaged by one of the spaced contacts on the shaft, a second lever provided with a yoke adapted to be intermittently engaged by the other spaced contact on the shaft, means connecting the armatures with the shaft to impart a rotary movement thereto when said armatures are moved, and circuits including the electro-magnets, said circuits provided with terminals.

In testimony whereof I affix my signature in presence of two witnesses.

GEORGE W. AMANN, JR.

Witnesses:
HERMAN LEICHT,
EMILIE GILSE.